(12) United States Patent
Lee et al.

(10) Patent No.: US 11,570,427 B2
(45) Date of Patent: Jan. 31, 2023

(54) APPARATUS FOR TESTING CAMERA MODULE

(71) Applicant: ISMEDIA CO., LTD., Anyang-si (KR)

(72) Inventors: Byoung Dae Lee, Suwon-si (KR); Hyunseok Kim, Anyang-si (KR); Chanyoung Park, Suwon-si (KR); MinSeog Choi, Bucheon-si (KR)

(73) Assignee: ISMEDIA CO., LTD., Anyang-si (KR)

( * ) Notice: Subject to any disclaimer, the term of this patent is extended or adjusted under 35 U.S.C. 154(b) by 0 days.

(21) Appl. No.: 17/388,710

(22) Filed: Jul. 29, 2021

(65) Prior Publication Data

US 2022/0116585 A1 Apr. 14, 2022

(30) Foreign Application Priority Data

Oct. 13, 2020 (KR) .......................... 10-2020-0131885

(51) Int. Cl.
*H04N 17/00* (2006.01)
*H04N 5/225* (2006.01)

(52) U.S. Cl.
CPC ........... *H04N 17/002* (2013.01); *H04N 5/225* (2013.01); *H04N 17/00* (2013.01)

(58) Field of Classification Search
CPC ....... H04N 17/00; H04N 17/002; H04N 5/225
USPC ......................................................... 348/187
See application file for complete search history.

(56) References Cited

U.S. PATENT DOCUMENTS

| | | | | |
|---|---|---|---|---|
| 7,609,372 B1* | 10/2009 | Tsai | .................... | G03B 43/00 356/124.5 |
| 9,451,247 B2* | 9/2016 | He | ...................... | H04N 17/002 |
| 10,209,202 B1* | 2/2019 | Sullivan | ............ | G01N 21/8806 |
| 11,089,292 B2* | 8/2021 | Price | .................... | F16M 11/02 |

FOREIGN PATENT DOCUMENTS

| | | |
|---|---|---|
| JP | 2017134074 | 8/2017 |
| KR | 1020180126106 | 11/2018 |
| KR | 1020190099897 | 8/2019 |

* cited by examiner

*Primary Examiner* — Trang U Tran
(74) *Attorney, Agent, or Firm* — Saliwanchik, Lloyd & Eisenschenk

(57) ABSTRACT

Disclosed is an apparatus for testing a camera module, and the apparatus for testing the camera module according to the disclosure includes a socket section configured to settle the camera module thereon; a movable unit-pattern chart lens section comprising a housing, a light source unit provided inside the housing and emitting light toward the camera module, and a chart disposed below the light source unit inside the housing and formed with a unit pattern; a first actuator configured to actuate the movable unit-pattern chart lens section; a second actuator configured to actuate the socket section; and a test image capturer configured to obtain a test image from images captured while actuating the movable unit-pattern chart lens section or the socket section based on actuation of the first actuator or the second actuator.

7 Claims, 11 Drawing Sheets

APPARATUS FOR TESTING CAMERA MODULE

CROSS-REFERENCE TO RELATED APPLICATION

This application claims priority from Korean Patent Application No. 10-2020-0131885, filed on Oct. 13, 2020 in the Korean Intellectual Property Office, the disclosure of which is incorporated herein by reference.

BACKGROUND OF THE INVENTION

(a) Field of the Invention

The disclosure relates to an apparatus for testing a camera module, and more particularly, to a camera-module testing apparatus which can test resolution, etc. of a camera module mounted to a portable terminal or the like.

(b) Description of the Related Art

A mobile phone, a tablet computer or the like portable terminal is generally mounted with a camera module for performing an appended function such as a photo shoot, a video shoot, etc. in addition to the terminal's own functions. With recent development of technology, the camera module has been developed for subminiaturization, high resolution, and high pixel density.

The camera module includes an image sensor such as a charge coupled device (CDD), a complementary metal-oxide semiconductor (CMOS), etc., and a lens mounted in front of the image sensor, and is subjected to various tests for identifying whether the camera module normally operates before shipment of the camera module.

In general, various tests including a resolution test for the camera module are carried out based on an image of a resolution chart captured by the camera module.

FIG. 1 schematically illustrates a configuration of a conventional test apparatus for a camera module. Conventionally, a light source 20 and a resolution chart 30 marked with predetermined patterns are placed above a camera module 50, the camera module 50 mounted to a socket 10 is used to capture the whole chart 30, and the patterns on the captured image are analyzed to test a resolution, etc.

As illustrated therein, when the camera module 50 has an angle of view of 80°~90°, it is easy for the conventional method to test the camera module 50. However, the wider the angle of view of the camera module 50 is, the bigger the resolution chart 30 and the light source 20 are required to capture the resolution chart 30 within the angle of view. If the resolution chart 30 is too big, it is difficult to manufacture the resolution chart 30, and a problem may arise in that the size of the whole apparatus for testing the camera module becomes too big.

PRIOR ART BIBLIOGRAPHY

Patent Documents

Korean Patent Publication No. 10-2017-0070296

SUMMARY OF THE INVENTION

Accordingly, an aspect of the disclosure is to solve the conventional problems and provide an apparatus for testing a camera module, in which a test image is obtained through-out an angle of view of the camera module from images captured while actuating a movable unit-test chart lens section formed with a unit pattern or a socket section in which the camera module is placed, and a camera test is easily carried out with regard to the camera module having a large angle of view.

The problems to be solved by the disclosure are not limited to those mentioned above, and other unmentioned problems will become apparent to a person skilled in the art by the following descriptions.

In accordance with an embodiment of the disclosure, there is provided an apparatus for testing a camera module, including: a socket section configured to settle the camera module thereon; a movable unit-test chart lens section including a housing, a light source unit provided inside the housing and emitting light toward the camera module, and a chart disposed below the light source unit inside the housing and formed with a unit pattern; a first actuator configured to actuate the movable unit-test chart lens section; a second actuator configured to actuate the socket section; and a test image capturer configured to obtain a test image from images captured while actuating the movable unit-test chart lens section or the socket section based on actuation of the first actuator or the second actuator.

Here, the first actuator may be configured to rotate the movable unit-test chart lens section above the camera module with respect to a first axis perpendicular to a normal of an upper surface of the socket section.

Here, the first axis may be oriented toward a center of the camera module.

Here, the first actuator may include a first motor; and a rotary frame configured to rotate with respect to the first axis based on power received from the first motor, lengthwise extended in a radial direction, and fastening the movable unit-test chart lens section, wherein the movable unit-test chart lens section may be fastened to the rotary frame from an upper end portion toward a lower end portion of the rotary frame.

Here, the second actuator may include a second motor configured to rotate the socket section with respect to a second axis normal to the socket section.

Here, the movable unit-test chart lens section may further include a collimator lens disposed in a lower end portion inside the housing.

Here, the apparatus may further include a third actuator configured to actuate the socket section in six axes (to move along an X axis, move along a Y axis, move along a Z axis, rotate with respect to the X axis, rotate with respect to the Y axis, and rotate with respect to the Z axis).

BRIEF DESCRIPTION OF THE DRAWINGS

The above and/or other aspects of the disclosure will become apparent and more readily appreciated from the following description of the exemplary embodiments, taken in conjunction with the accompanying drawings, in which.

DETAILED DESCRIPTION

Specific features of embodiments are involved in the detailed description and the accompanying drawings.

The merits and features of the disclosure, and methods of achieving them will become apparent with reference to the embodiments described below in detail and the accompanying drawings. However, the disclosure is not limited to the embodiments set forth herein, but may be implemented in various forms. The following embodiments are provided in order to fully describe the disclosure and enable those skilled in the art, to which the disclosure pertains, to understand the disclosure, the scope of which is defined in the appended claims. Like numerals refer to like elements throughout.

Below, embodiments of an apparatus for testing a camera module according to the disclosure will be described with reference to the accompanying drawings.

Figure 1:
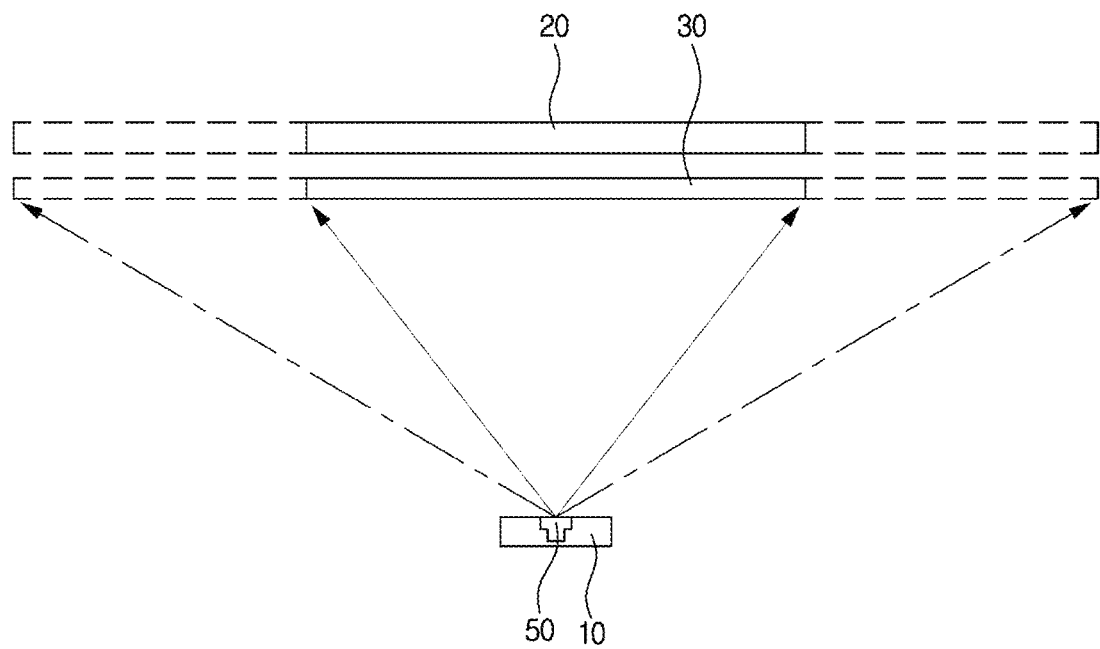
FIG. 1 schematically illustrates configuration of a conventional test apparatus for a camera module.
Figure 2:
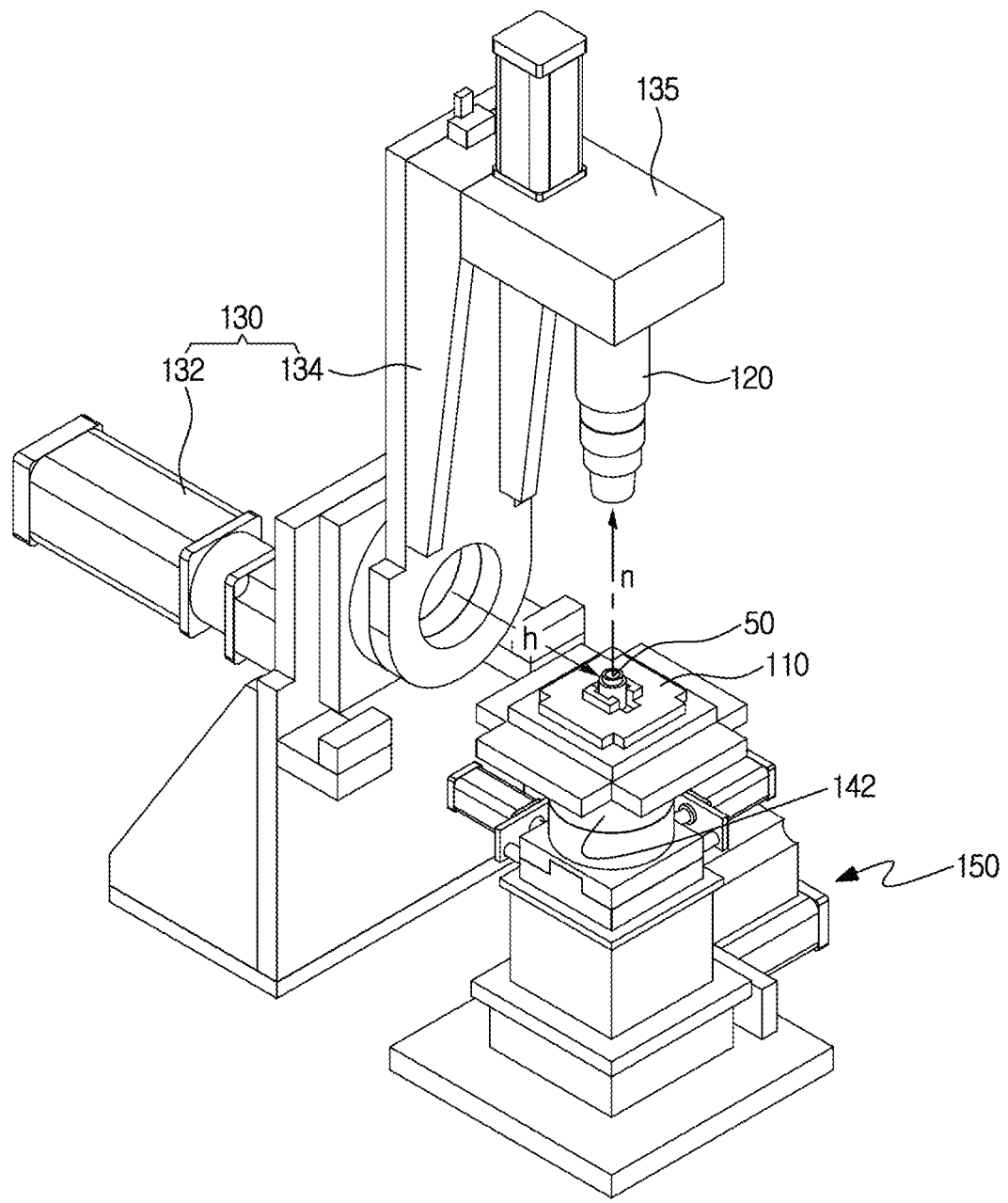
FIG. 2 is a perspective view of an apparatus for testing a camera module according to an embodiment of the disclosure.
Figure 3:
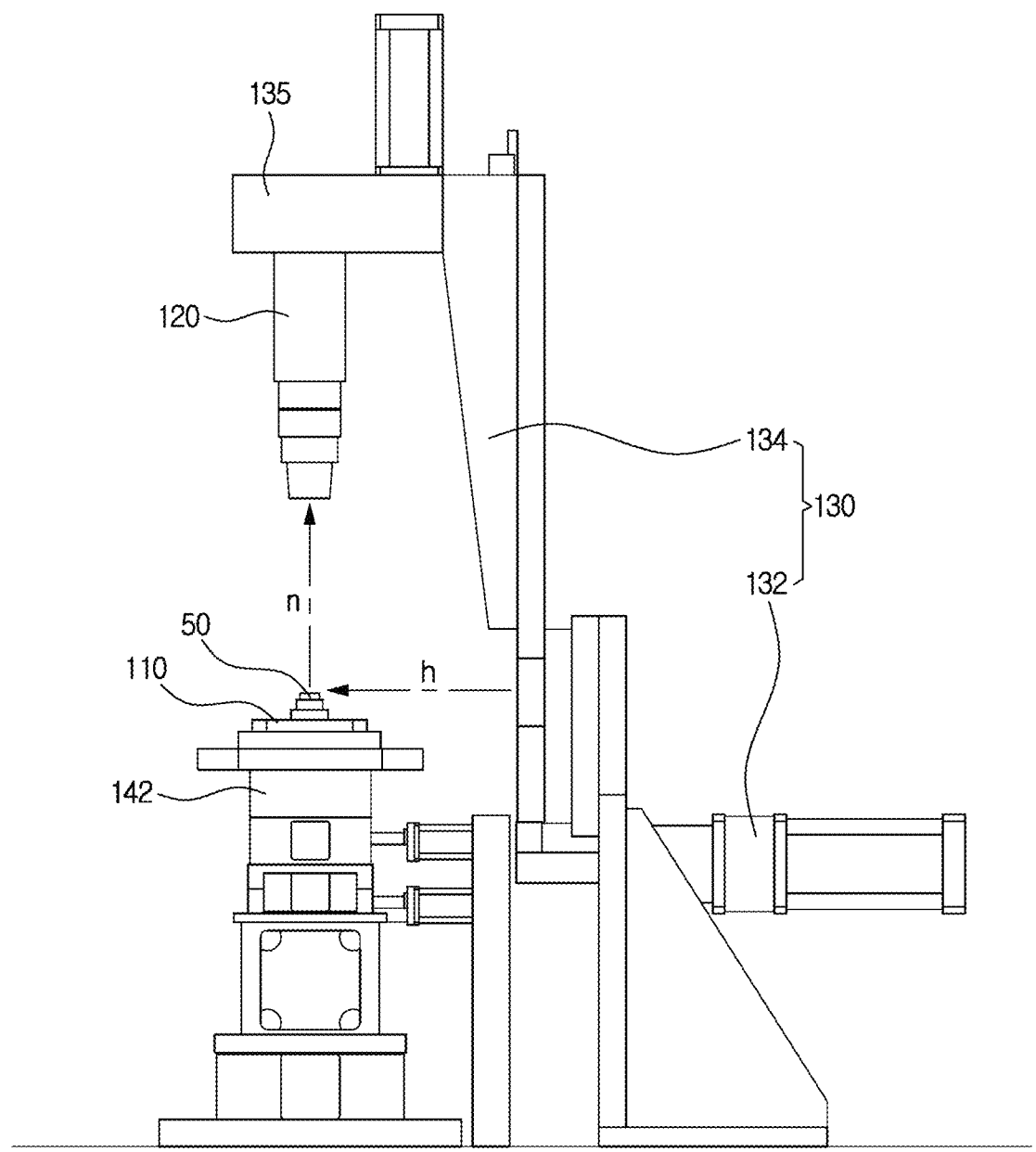
FIG. 3 is a lateral view of FIG. 2.
Figure 4:
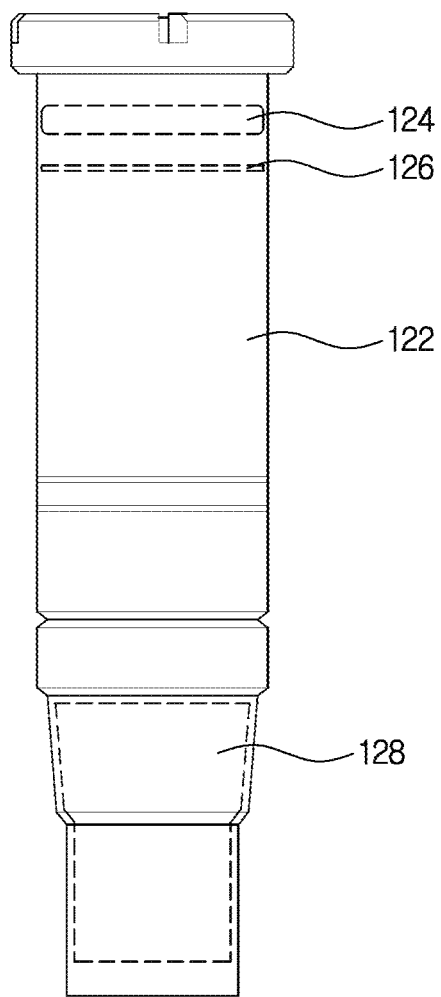
FIG. 4 illustrates a movable unit-test chart lens section in FIG. 2.
Figure 5:
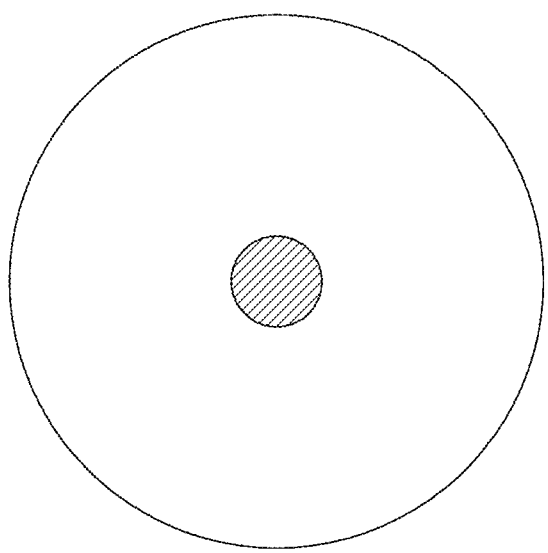
FIG. 5 illustrates an example of a chart formed with a unit pattern included in the movable unit-test chart lens section of FIG. 4.

FIG. 2 is a perspective view of an apparatus for testing a camera module according to an embodiment of the disclosure; FIG. 3 is a lateral view of FIG. 2; FIG. 4 illustrates a movable unit-test chart lens section in FIG. 2; and FIG. 5 illustrates an example of a chart formed with a unit pattern included in the movable unit-test chart lens section of FIG. 4.

The apparatus for testing the camera module according to an embodiment of the disclosure includes a socket section 110, a movable unit-pattern chart lens section 120, a first actuator 130, a second actuator, and a test image capturer (not shown).

As shown in FIGS. 2 and 3, the socket section 110 refers to a jig in which the camera module 50 to be tested is settled. A robot arm or the like additional device may be used to automatically settle the camera module 50 in the socket section 110 or separate the tested camera module 50 from the socket section 110.

The socket section 110 may be formed with a groove on the top thereof to settle the camera module 50 therein and electrically connect with the camera module 50.

As shown in FIG. 4, the movable unit-pattern chart lens section 120 may include a housing 122, a light source unit 124, and a chart 126. Further, the movable unit-pattern chart lens section 120 may further include a collimator lens 128.

The housing 122 is shaped like an approximately long hollow cylinder, and mounted with the light source unit 124, the chart 126 and the collimator lens 128 from above. Further, the housing 122 may be coupled to a rotary frame 134 of the first actuator 130 to be described later, and rotate with respect to a predetermined axis h above the socket section 110.

The light source unit 124 is disposed in an upper end portion of the housing 122 and emits light downward. The light of the light source unit 124 is emitted toward the camera module 50. The light source unit 124 may be achieved by a light emitting diode (LED), but not limited thereto.

Inside the housing 122, the chart 126 is provided below the light source unit 124. The chart 126 is formed with a unit pattern as a part of patterns that constitute the conventional chart 20. For example, the unit pattern may be a single dot having a predetermined diameter as shown in FIG. 5. The shape of the unit pattern and the number of patterns (for example, the number of dots) that make up the unit pattern are not limited to those shown in FIG. 5.

In conventional test apparatus, the camera module 50 captures the chart formed with a plurality of patterns at once to obtain the test image. But the test apparatus according to the disclosure captures images of the unit pattern at various positions and angles and merges the captured images to obtain the test image.

To this end, the first actuator 130 and the second actuator according to the disclosure actuate the movable unit-pattern chart lens section 120 and the socket section 110, respectively. As the position of the movable unit-pattern chart lens section 120 or the rotation angle of the socket section 110 are changed by the first actuator 130 and the second actuator, the images of the unit pattern are captured on at various positions of image sensor of the camera module 50. Therefore, it is possible to obtain a test image with regard to the full angle of view of the camera module 50 by merging the captured images, and it is thus possible to obtain a test image like the conventional test image obtained by capturing the whole chart 30 formed with the plurality of patterns at once.

In such a conventional case where the test image is obtained by capturing the whole chart 30 formed with the patterns at once, it is difficult to manufacture the chart 30 because the wider the angle of view of the camera module 50, the bigger the resolution chart 30. Further, the bigger the chart 30, the heavier the edge images of the chart 30 will be distorted due to difference in distance between the chart 30 and the camera module 50.

However, when the movable unit-pattern chart lens section 120 formed with the unit pattern according to the disclosure is used, there is no need of making the chart 126 big corresponding to the angles of view, and it is therefore possible to easily obtain the test image with regard to the camera module 50 having a wide angle of view.

Inside the housing 122, the collimator lens 128 may be provided in a lower portion of the movable unit-pattern chart lens section 120. The collimator lens 128 serves to convert an object into a virtual distance by varying a focusing point, and makes it easy to carry out a long-distance resolution test through the collimator lens 128. In other words, the collimator lens 128 disposed between the camera module 50 and the chart 126 varies the focusing point of the chart 126 and makes it seem as if the chart 126 is positioned at a long distance even though the chart 126 is actually positioned at a short distance from the camera module 50, thereby performing the long-distance resolution test.

Therefore, the collimator lens 128 makes it possible to reduce a testing space and improve space efficiency.

The first actuator 130 actuates the movable unit-pattern chart lens section 120. In more detail, the first actuator 130 rotates the movable unit-pattern chart lens section 120 above the camera module 50 with respect to a first axis h perpendicular to the normal n of the upper surface of the socket section 110 positioned below the movable unit-pattern chart lens section 120.

In this case, the rotational center, i.e., the first axis h of the movable unit-pattern chart lens section 120 may be positioned at the center of the camera module 50 or above or below the vicinity of the center.

Therefore, the distance between the movable unit-pattern chart lens section 120 and the camera module 50 is not varied but kept constant even though the movable unit-pattern chart lens section 120 is rotated by the first actuator 130.

The first actuator 130 may include a first motor 132 providing power for rotation, and the rotary frame 134 lengthwise extended in the radial direction of the first axis h and rotating with respect to the first axis h based on the power from the first motor 132. A holder 135 is formed in an upper portion of the rotary frame 134 and protrudes frontward, and the movable unit-pattern chart lens section 120 is fastened to a bottom lateral side of the holder 135 toward the socket section 110. In this case, the first actuator 130 may rotate the movable unit-pattern chart lens section 120 90 degrees leftward and rightward with respect to the first axis h.

Although the movable unit-pattern chart lens section 120 is rotated by the first actuator 130 with respect to the first axis h, the light emitted from the light source unit 124 always faces toward the camera module 50. Therefore, if the unit pattern is captured at the center of the image sensor of the camera module 50 when the camera module 50 captures the chart 126 formed with the unit pattern in the state that the movable unit-pattern chart lens section 120 is disposed vertically above the camera module 50 as shown in FIG. 2, the first actuator 130 rotates the movable unit-pattern chart lens section 120 leftward or rightward by a predetermined angle with respect to the first axis h and then the chart 126 formed with the unit pattern is captured, thereby capturing the unit pattern at a right and left position from the center of the image sensor.

Like this, the camera module 50 captures the unit pattern of the movable unit-pattern chart lens section 120 while the movable unit-pattern chart lens section 120 is rotated by a predetermined angle, and merges the images of the unit pattern among the captured images, thereby obtaining an image, where a plurality of unit patterns is arranged in one direction, within the image sensor.

Next, the second actuator actuates the socket section 110. In more detail, the second actuator rotates the socket section 110 with respect to a second axis n, i.e., the normal of the upper surface of the socket section 110. The second axis n may be oriented toward the center of the image sensor of the camera module 50. In this embodiment, the second actuator may include a second motor 142 placed under the socket section 110 and rotating the socket section 110.

As described above, the image in which the unit patterns are arranged in one direction passing through the center of the image sensor may be obtained while the movable unit-pattern chart lens section 120 is rotated by the first actuator 130. In this case, when the camera module 50 captures the unit pattern while the second actuator rotates the socket section 110 by a predetermined angle and the first actuator 130 rotates the movable unit-pattern chart lens section 120 again by a predetermined angle with respect to the first axis h, thereby obtaining an image in which the unit patterns are arranged in another direction passing through the center of the image sensor (for example, referring to FIG. 11, an image captured in a diagonal direction from an upper left side to a lower right side is a merged image of unit patterns captured while the first actuator 130 rotates the movable unit-pattern chart lens section 120 by a predetermined angle in the state that the socket section 110 is fixed at a predetermined angle, but an image captured in a diagonal direction from an upper right side to a lower left side is a merged image of unit patterns captured while the second actuator rotates the socket section 110 90 degrees clockwise or counterclockwise and the first actuator 130 rotates the movable unit-pattern chart lens section 120 by a predetermined angle.)

The test image capturer refers to an image processor that merges the images of the unit pattern captured while the position of the movable unit-pattern chart lens section 120 and/or the rotation angle of the socket section 110 are varied as the movable unit-pattern chart lens section 120 or the socket section 110 is driven as described above, and generates a test image as if the test image is obtained by capturing a plurality of unit patterns in the image sensor.

Next, a third actuator 150 for actuating the socket section 110 in six axes may be further provided according to the disclosure. The third actuator 150 actuates the socket section 110 to move (move in an X axial direction, move in a Y axial direction and move in a Z axial direction) and rotate (rotate with respect to an X axis, rotate with respect to a Y axis and rotate with respect to a Z axis) among three axial directions of an orthogonal coordinates system (XYZ). When the normal direction of the socket section 110 is in the Z axial direction, the foregoing second actuator is configured to rotate the socket section 110 with respect to the Z axis, and therefore an element including the second actuator and configured to actuate the socket section 110 to move in the X, Y and Z axial directions and rotate with respect to the X and Y axes may be called the third actuator 150.

The third actuator may include a third motor for moving the socket section 110 in the X axial direction, a fourth motor for moving the socket section 110 in the Y axial direction, a fifth motor for moving the socket section 110 in the Z axial direction, a sixth motor for rotating the socket section 110 with respect to the X axis, a seventh motor for rotating the socket section 110 with respect to the Y axis, and the second motor for rotating the socket section 110 with respect to the Z axis.

The third actuator 150 finely actuates the socket section 110 in the six axes so that the camera module 50 can be in place when the camera module 50 is first mounted to the socket section 110. By the third actuator 150, it is possible to adjust the levelness of the camera module 50 mounted to the socket section 110, and align the center of the image obtained by initially capturing the chart 126 with the center of the chart 126, thereby improving the reliability of the test.

Below, operations of an apparatus for testing a camera module according to the disclosure will be described by way of example.

Figure 9:
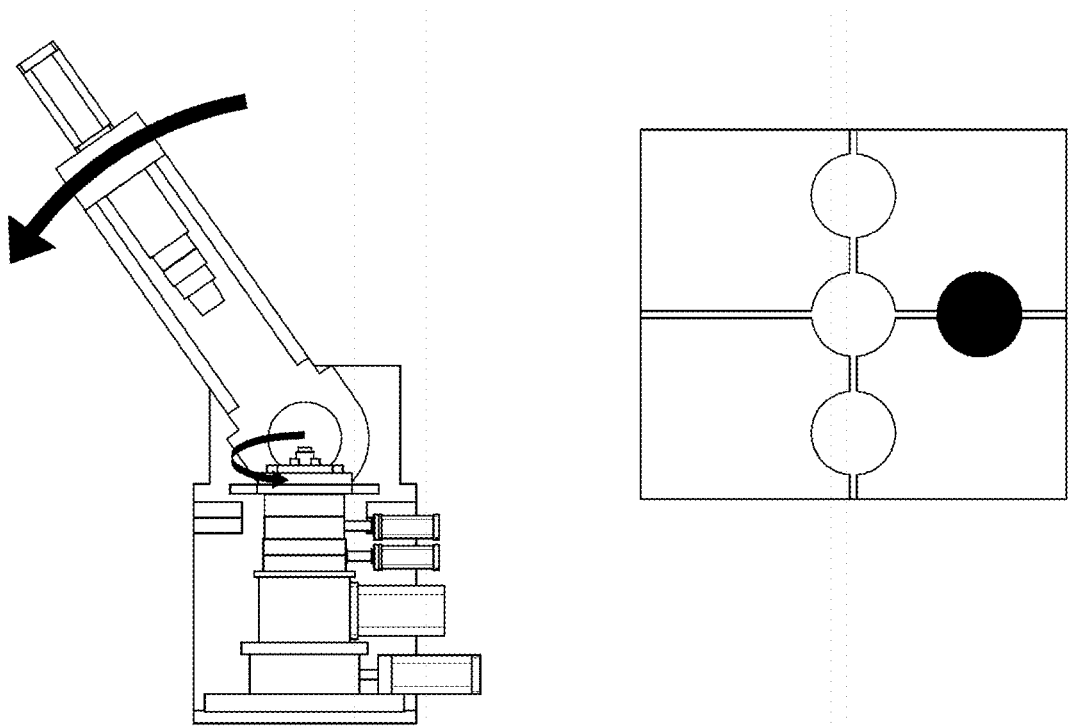
Figure 10:
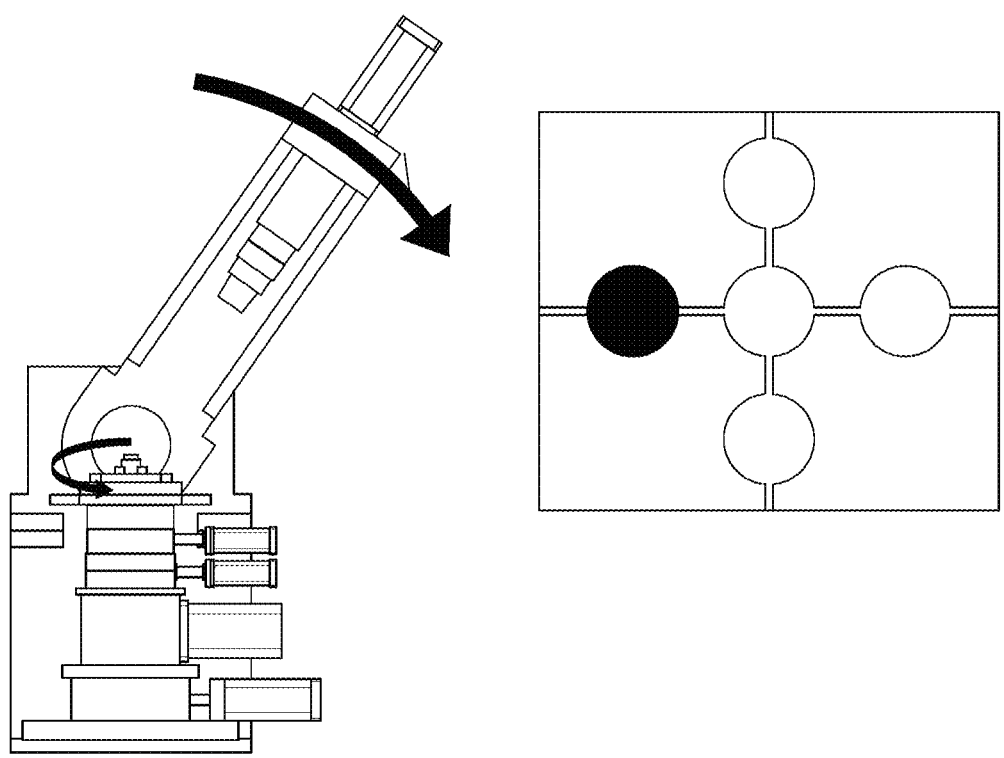
Figure 11:
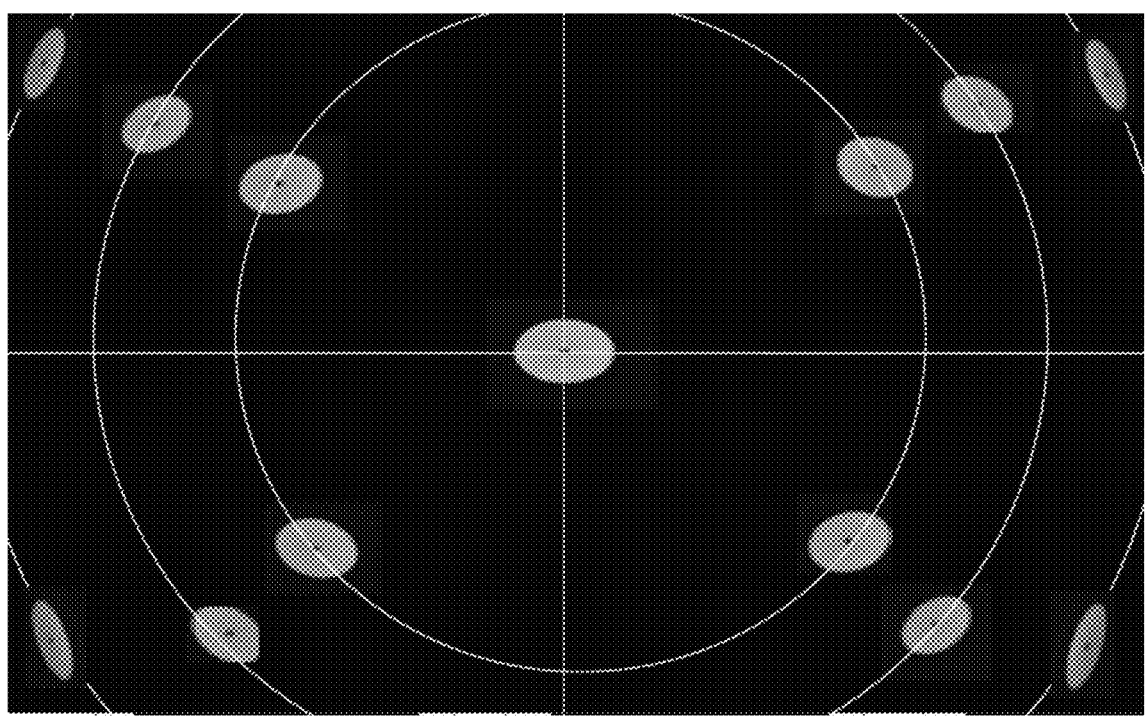
FIG. 11 illustrates an actual test image obtained by the apparatus for testing the camera module according to the disclosure.

FIGS. 6 to 10 illustrate an example of testing operations based on the apparatus for testing the camera module according to the disclosure, and FIG. 11 illustrates an actual test image obtained by the apparatus for testing the camera module according to the disclosure.

First, before a photo shoot for obtaining a test image, the third actuator 150 operates to dispose the camera module 50 horizontally and align the center of the image sensor with the center of the chart 126 when the movable unit-pattern chart lens section 120 is positioned vertically above the camera module 50.

Figure 6:
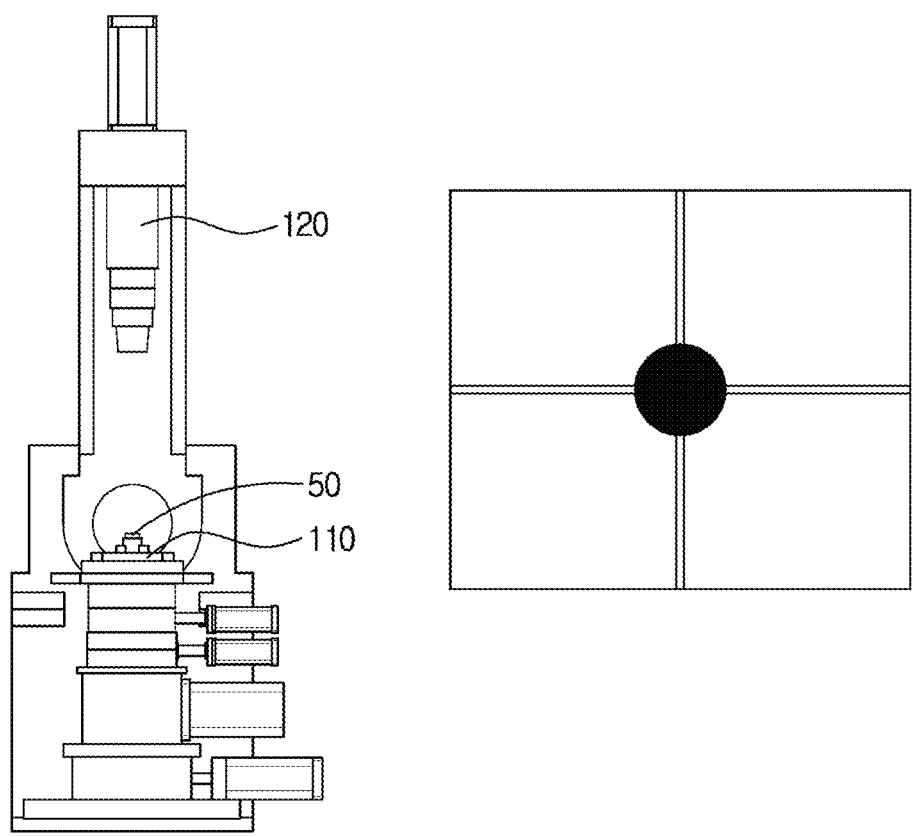
FIGS. 6 to 10 illustrate an example of testing operations based on the apparatus for testing the camera module according to the disclosure.

Next, the camera module 50 captures an image of the chart 126 in the state that the movable unit-pattern chart lens section 120 is positioned vertically above the socket section 110, thereby obtaining the image in which the unit pattern is positioned at the center of the image sensor as shown in FIG. 6.

Figure 7:
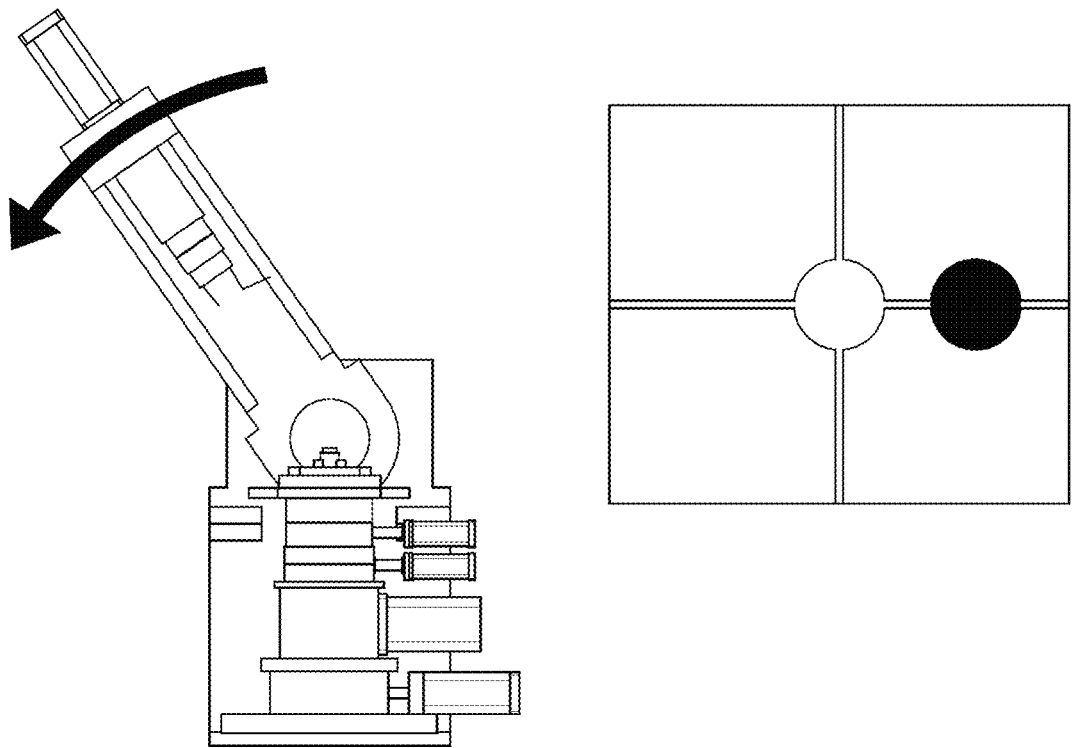

Next, the camera module 50 captures an image of the chart 126 in the state that the rotation angle of the socket section 110 is not changed and the movable unit-pattern chart lens section 120 is counterclockwise rotated 45 degrees by the first actuator 130, thereby obtaining the image in which the unit pattern is positioned at a right side from the center of the image sensor as shown in FIG. 7. For reference, in the accompanying drawings, the white unit pattern indicates a previously captured unit pattern, and the black unit pattern indicates a currently captured unit pattern.

Figure 8:
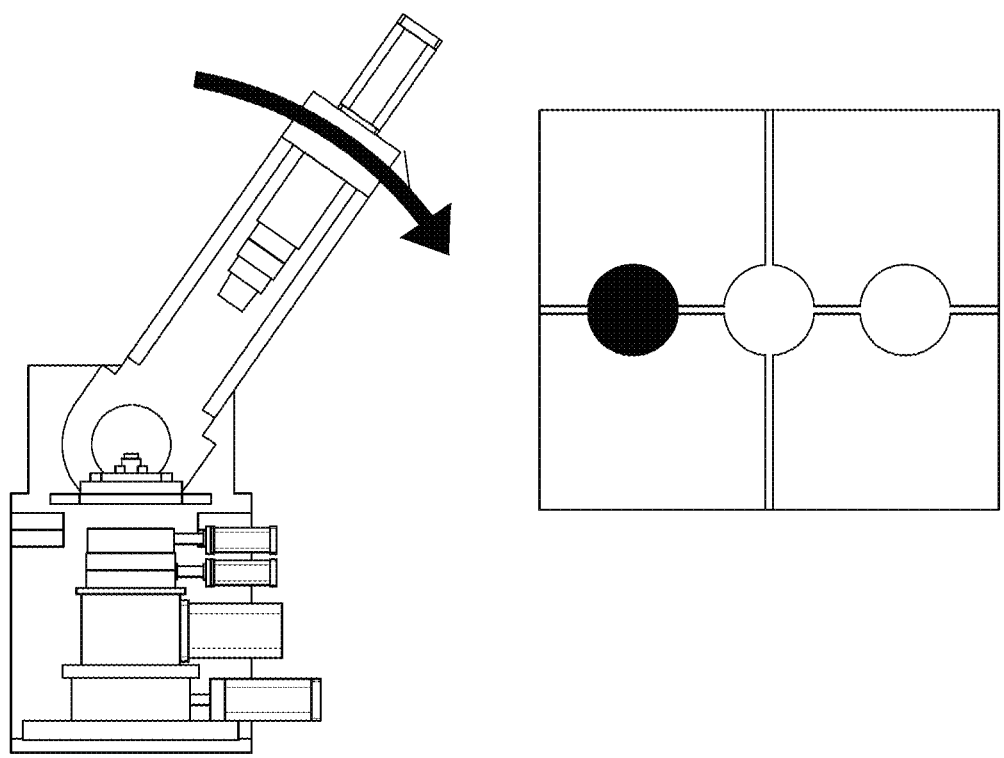

Next, the camera module 50 captures an image of the chart 126 in the state that the rotation angle of the socket section 110 is not changed and the movable unit-pattern chart lens section 120 is clockwise rotated 45 degrees by the first actuator 130, thereby obtaining the image in which the unit pattern is positioned at a left side from the center of the image sensor as shown in FIG. 8.

Next, the camera module 50 captures an image of the chart 126 in the state that the socket section 110 is counterclockwise rotated 90 degrees by the second actuator and the movable unit-pattern chart lens section 120 is clockwise rotated 45 degrees by the first actuator 130, thereby obtaining the image in which the unit pattern is positioned at a right side from the center of the image sensor (at a lower side from the center of the image sensor in FIG. 6) as the rotation angle of the image sensor is changed as shown in FIG. 9.

Next, the camera module 50 captures an image of the chart 126 in the state that the socket section 110 is kept clockwise-rotated 90 degrees and the movable unit-pattern chart lens section 120 is clockwise rotated 45 degrees by the first actuator 130, thereby obtaining the image in which the unit pattern is positioned at a left side from the center of the image sensor as shown in FIG. 10 (at an upper side from the center of the image sensor in FIG. 6).

Like this, according to the disclosure, the test image capturer merges the images of the unit pattern, which are captured while moving the movable unit-pattern chart lens section 120 and changing the rotation angle of the socket section 110 based on actuation of the first actuator 130 and the second actuator, to obtain the test image with regard to the angle of view of the camera module 50, thereby performing the resolution test or the like based on the obtained test image.

As described above, an apparatus for testing the camera module according to the disclosure has an advantage that a camera module is tested using a chart even though the camera module has a large angle of view.

Further, it is advantageously possible to reduce the size of the test apparatus because there is no need of making the chart bigger.

The scope of the disclosure is not limited to the foregoing embodiments, but may be actualized by various embodiments within the appended claims. It will be appreciated by any person having an ordinary skill in the art to which the disclosure pertains that various changes can be made without departing from the gist of the disclosure claimed in the appended claims.

What is claimed is:

1. An apparatus for testing a camera module, comprising:
a socket section configured to settle the camera module thereon;
a movable unit-pattern chart lens section comprising a housing, a light source unit provided inside the housing and emitting light toward the camera module, and a chart disposed below the light source unit inside the housing and formed with a unit pattern;
a first actuator configured to actuate the movable unit-pattern chart lens section;
a second actuator configured to actuate the socket section; and
a test image capturer configured to obtain a test image by merging images of the unit pattern captured by the camera module at a plurality of positions where a distance between the movable unit-pattern chart lens section and the camera module is constant while actuating the movable unit-pattern chart lens section or the socket section based on actuation of the first actuator or the second actuator.

2. The apparatus according to claim 1, wherein the first actuator is configured to rotate the movable unit-pattern chart lens section above the camera module with respect to a first axis perpendicular to a normal of an upper surface of the socket section.

3. The apparatus according to claim 2, wherein the first axis is oriented toward a center of the camera module.

4. The apparatus according to claim 2, wherein the first actuator comprises
a first motor; and
a rotary frame configured to rotate with respect to the first axis based on power received from the first motor, being lengthwise extended in a radial direction and fastening the movable unit-pattern chart lens section,
wherein the movable unit-pattern chart lens section is fastened to the rotary frame from an upper end portion toward a lower end portion of the rotary frame.

5. The apparatus according to claim 2, wherein the second actuator comprises a second motor configured to rotate the socket section with respect to a second axis normal to the socket section.

6. The apparatus according to claim 1, wherein the movable unit-pattern chart lens section further comprises a collimator lens disposed in a lower end portion inside the housing.

7. The apparatus according to claim 1, further comprising a third actuator configured to actuate the socket section in six axes (to move along an X axis, move along a Y axis, move along a Z axis, rotate with respect to the X axis, rotate with respect to the Y axis, and rotate with respect to the Z axis).

* * * * *